(12) United States Patent
López-Herrero et al.

(10) Patent No.: US 12,325,505 B2
(45) Date of Patent: Jun. 10, 2025

(54) AIRCRAFT FUSELAGE INTENDED TO RECEIVE TWO TANKS DESIGNED TO CONTAIN LIQUID HYDROGEN

(71) Applicants: AIRBUS SAS, Blagnac (FR); Airbus Operations SAS, Toulouse (FR); AIRBUS OPERATIONS LTD, Bristol (GB); Airbus Operations SL, Getafe (ES); Airbus Operations GmbH, Hamburg (DE)

(72) Inventors: Elisa Alvarez López-Herrero, Hamburg (DE); Matthias Wolff, Hamburg (DE); Alexander Broer, Hamburg (DE); Rainer Tegtmeyer, Hamburg (DE); Michael Wießmeier, Hamburg (DE); Till Marquardt, Hamburg (DE); André Anger, Hamburg (DE); Anna-Katrin Wengorra, Hamburg (DE); Marco Dias Figueiredo, Hamburg (DE); Jose Luis Martinez Munoz, Getafe Madrid (ES); Alberto Gallegos Elvira, Madrid (ES); Kaya Sahin, Blagnac (FR); Guillaume Gallant, Toulouse (FR); Kasidit Leoviriyakit, Bristol (GB); Philip Wright, Bristol (GB)

(73) Assignees: AIRBUS SAS, Blagnac (FR); Airbus Operations SAS, Toulouse (FR); AIRBUS OPERATIONS LTD, Bristol (GB); Airbus Operations SL, Getafe (ES); Airbus Operations GmbH, Hamburg (DE)

( * ) Notice: Subject to any disclaimer, the term of this patent is extended or adjusted under 35 U.S.C. 154(b) by 92 days.

(21) Appl. No.: 18/127,052

(22) Filed: Mar. 28, 2023

(65) Prior Publication Data
US 2023/0339593 A1 Oct. 26, 2023

(30) Foreign Application Priority Data
Apr. 20, 2022 (FR) ........................................ 2203661

(51) Int. Cl.
*B64C 1/06* (2006.01)
*B64C 1/10* (2006.01)
*B64D 37/04* (2006.01)

(52) U.S. Cl.
CPC ............... *B64C 1/068* (2013.01); *B64C 1/10* (2013.01); *B64D 37/04* (2013.01)

(58) Field of Classification Search
CPC ............ B64C 1/068; B64C 1/10; B64D 37/04; B64D 37/30; B64G 1/4022
See application file for complete search history.

(56) References Cited

U.S. PATENT DOCUMENTS 5,740,985 A * 4/1998 Scott ......................... B64D 5/00
244/159.3
6,123,295 A * 9/2000 Wexler ................... B64D 37/04
244/119

(Continued)

FOREIGN PATENT DOCUMENTS

FR 3096029 A1 11/2020
FR 3097201 A1 * 12/2020 ............. B64D 27/24

(Continued)

OTHER PUBLICATIONS

Winter, C.J. "Hydrogen in high-speed air transportation" International Journal of Hydrogen Energy, Elsevier Ltd, Feb. 1990, pp. 579-595, vol. 15, No. 8.

(Continued)

*Primary Examiner* — Joshua J Michener
*Assistant Examiner* — Cindi M Curry
(74) *Attorney, Agent, or Firm* — Lerner David LLP

(57) ABSTRACT

An aircraft fuselage is configured to receive two tanks designed to contain liquid hydrogen. The fuselage includes (Continued)

a first section for a cockpit, a second section for a passenger cabin and a third section (T3) distinct from the first section (T1) and from the second section (T2). The third section (T3) includes two housings each to house a tank. The two housings are arranged symmetrically with respect to a vertical plane of symmetry (P1). This arrangement of the tanks in a section distinct from the other sections allows them to be located as close as possible to the motors that they have to supply.

16 Claims, 6 Drawing Sheets

(56) References Cited

U.S. PATENT DOCUMENTS

| | | | | |
|---|---|---|---|---|
| 6,422,514 | B1* | 7/2002 | Clark | B64G 1/4022 |
| | | | | 244/172.3 |
| 7,281,682 | B2* | 10/2007 | D'Auvergne | B64G 1/14 |
| | | | | 244/159.3 |
| 11,807,383 | B2* | 11/2023 | Dean | B64C 7/00 |
| 2005/0230554 | A1* | 10/2005 | Schoene | B64D 37/04 |
| | | | | 244/135 R |
| 2008/0230654 | A1* | 9/2008 | Velicki | B64D 37/04 |
| | | | | 244/135 R |
| 2021/0339858 | A1* | 11/2021 | Ermanoski | B64D 37/30 |
| 2023/0339593 | A1* | 10/2023 | López-Herrero | B64D 37/04 |
| 2023/0406526 | A1* | 12/2023 | Vassberg | B64C 39/10 |
| 2024/0270401 | A1* | 8/2024 | Kondo | B64D 37/04 |

FOREIGN PATENT DOCUMENTS

| | | |
|---|---|---|
| FR | 3100798 A1 | 3/2021 |
| KR | 20210002874 U | 12/2021 |

OTHER PUBLICATIONS

Seeckt, K. et al., "Hydrogen Powered Freighter Aircraft—The Final Results of the Green Freighter Project" 27th International Congress of The Aeronautical Sciences, Sep. 2010, pp. 1-13. https://www.icas.org/ICAS_ARCHIVE/ICAS2010/PAPERS/228.PDF.

French Search Report dated Nov. 18, 2022 for Application No., FR 2203661. 2 pgs. (see p. 1, categorizing the cited references).

* cited by examiner

AIRCRAFT FUSELAGE INTENDED TO RECEIVE TWO TANKS DESIGNED TO CONTAIN LIQUID HYDROGEN

FIELD OF THE INVENTION

The present invention relates to an aircraft fuselage intended to receive two tanks designed to contain liquid hydrogen.

BACKGROUND OF THE INVENTION

In order to move, an aircraft comprises propulsion systems comprising at least one engine. The propulsion systems can correspond to both jet engines or turboprop engines in which an engine drives a propellor in rotation.

The engines of these propulsion systems can correspond to internal combustion engines supplied by liquid hydrogen. These engines can also correspond to electric motors supplied by fuel cells. In order to supply these engines, liquid hydrogen tanks have to be installed on board.

The configuration studied for the tanks is to have them arranged in tandem, that is to say arranged one behind the other parallel to the longitudinal axis of the aircraft.

These types of installation can be a drawback if wanting to minimize the distance between the tanks and the engines (or the fuel cells) while minimizing, among other things, the drag and the weight.

BRIEF SUMMARY OF THE INVENTION

The present invention relates to an aircraft fuselage intended to receive two tanks designed to contain liquid hydrogen, the liquid hydrogen being intended to supply engines of at least one propulsion system of the aircraft, the fuselage having a vertical plane of symmetry and a first longitudinal axis, the two tanks each having a second longitudinal axis, the fuselage comprising, in the direction of advance of the aircraft, at least one first fuselage section configured to receive a cockpit and one second fuselage section configured to receive a passenger cabin.

According to an embodiment of the invention, the fuselage comprises a third fuselage section distinct from the first fuselage section and from the second fuselage section, the third fuselage section comprising two housings intended to each house a tank, the two housings are configured so that the second longitudinal axis of the two tanks is parallel to the first longitudinal axis of the fuselage of the aircraft when the two tanks are installed in their housing, the two housings being arranged symmetrically with respect to one another on either side of the vertical plane of symmetry, the two housings being configured so that the second longitudinal axis of the two tanks lies in a common plane when the two tanks are installed in their housing.

Thus, by virtue of the fact that the tanks can be installed side-by-side in a fuselage section distinct from the fuselage sections comprising the passenger cabin and the cockpit, the tanks can be situated as close as possible to the engines that they have to supply.

Furthermore, the third fuselage section comprises a working structure to which the two tanks are fixed.

According to a first embodiment, the third fuselage section is situated to the rear of the second fuselage section, the third fuselage section comprising a sealed bulkhead separating the second fuselage section and the third fuselage section.

Furthermore, the third fuselage section comprises a front zone situated between the second fuselage section and the two housings, the front zone comprising a first portion of the working structure intended to receive the propulsion system or systems of the aircraft.

In addition, the fuselage comprises two engine pylons fixed to the first portion of the working structure on either side of the vertical plane of symmetry.

Moreover, the third fuselage section comprises a rear zone, the rear zone comprising a second portion of the working structure intended to receive a vertical tail unit of the aircraft.

According to a second embodiment, the third fuselage section is situated between the first fuselage section and the second fuselage section, the third fuselage section comprising a first sealed bulkhead separating the first fuselage section and the third fuselage section, the third fuselage section further comprising a second sealed bulkhead separating the third fuselage section and the second fuselage section.

Furthermore, the third fuselage section comprises a rear zone situated between the two housings and the second fuselage section, the rear zone comprising a portion of the working structure intended to bear the propulsion system or systems of the aircraft.

Furthermore, the fuselage comprises two engine pylons fixed to the portion of the working structure on either side of the vertical plane of symmetry.

According to a first configuration, the third fuselage section has two lateral openings in a lateral part of the third fuselage section, the two lateral openings respectively connecting with one of the two housings, each of the two lateral openings being configured to allow a tank to be passed into a respective housing, the third fuselage section comprising two removable fairings, each of the removable fairings being configured to alternately close and open a respective lateral opening.

According to a second configuration, the third fuselage section has two lower openings in a lower part of the third fuselage section, the two lower openings respectively connecting with one of the two housings, each of the two lower openings being configured to allow a tank to be passed into a respective housing, the third fuselage section comprising two lower working doors, each of the lower working doors being configured to alternately close and open a respective lower opening.

According to a third configuration, the third fuselage section has two rear openings in a rear part of the third fuselage section, the two rear openings respectively connecting with one of the two housings, each of the two rear openings being configured to allow a tank to be passed into a respective housing, the third fuselage section comprising two rear working doors, each of the two rear working doors being configured to alternately close and open a respective rear opening.

Moreover, the working structure partitions the two housings.

Furthermore, the working structure surrounds the two housings.

Moreover, the working structure has a form that is elongate along the longitudinal axis and with a plane of symmetry that coincides with the vertical plane of symmetry.

The invention relates also to an aircraft, in particular a transport airplane comprising a fuselage as described above.

BRIEF DESCRIPTION OF THE DRAWINGS

The attached figures will give a good understanding of how the invention can be implemented. In these figures, identical references designate similar elements.

DETAILED DESCRIPTION

In the description, the longitudinal direction of the aircraft oriented positively in the direction of advance of the aircraft is "axis X". The transverse direction of the aircraft at right angles to the axis X is called "axis Y". The axes X and Y are horizontal when the aircraft is on the ground. The vertical direction of the aircraft at right angles to the axis X and to the axis Y is called "axis Z". A plane parallel to the axis X and to the axis Y is called "horizontal plane". A plane parallel to the axis X and to the axis Z which corresponds to the vertical plane of symmetry of the aircraft is called "vertical plane of symmetry".

In FIG. 1, FIG. 3 and FIG. 5 to FIG. 11, an arrow E is represented which indicates the direction of advance of the aircraft. The arrow E is directed from the rear to the front. In the description, the adjectives "front" and "rear" are therefore defined with respect to the direction of the arrow E.

In addition, the adjectives "upper" and "lower" are defined with respect to the ground on which the aircraft can advance. An object qualified by the adjective "lower" is situated closer to the ground than an object qualified by the adjective "upper".

The adjective "lateral" qualifies a part which is situated on one side and/or the other of the vertical plane of symmetry P1 and which does not cut the vertical plane of symmetry P1.

Moreover, hereinafter in the description, the expression "supply an engine" is considered to mean "supply a combustion engine" or "supply a fuel cell of an electric motor".

Figure 1:
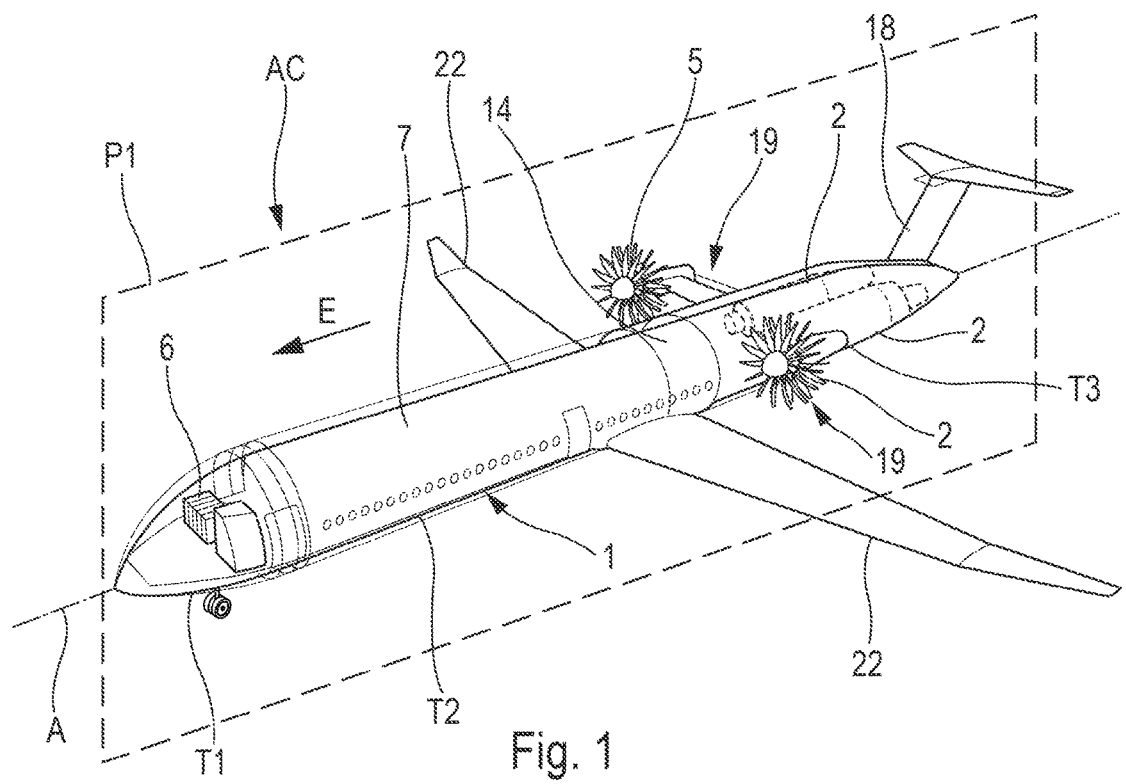
FIG. 1 represents a perspective front view of an aircraft comprising a fuselage intended to receive two tanks designed to contain liquid hydrogen.

FIG. 1 represents an aircraft AC comprising a fuselage 1 according to the invention.

The fuselage 1 can be implemented for different conventional aircraft AC configurations. For example, the fuselage 1 can be implemented for high-wing and low-wing aircraft. It can also be implemented for different positions of the engines 5. For example, the engines can be mounted on the airfoil or on the fuselage 1. Moreover, the engines 5 can correspond to different types of engine 5, such as unducted fan engines or turbofan engines.

FIG. 1 represents an aircraft AC comprising turboprop engines. However, it is understood that the invention is applicable also to an aircraft AC comprising turbojet engines.

The aircraft AC fuselage 1 is intended to receive two tanks 2 designed to contain liquid hydrogen. The liquid hydrogen is intended to supply engines 5 of at least one propulsion system 19 of the aircraft AC.

The fuselage 1 has a vertical plane of symmetry P1 and a longitudinal axis A. The tanks 2 intended to be received by the fuselage 1 each have a longitudinal axis B.

Figure 2:
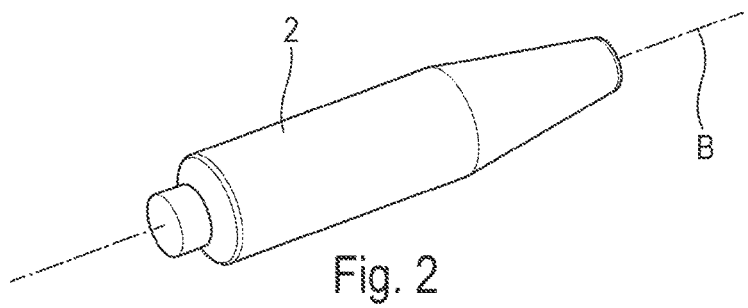
FIG. 2 represents a perspective view of a tank designed to contain liquid hydrogen and intended to be housed in the fuselage.

Advantageously, the two tanks 2 have an axisymmetrical form about their respective longitudinal axis B. The two tanks 2 can be in spherical, cylindrical, cone or truncated cone form or have a form adjoining a truncated cone to a cylinder or any other form (for example, the tanks 2 can have a cross section comprising a succession of straight portions forming a closed section). The form is axisymmetrical for reasons of weight linked to the pressurization of the liquid hydrogen in the tanks 2. FIG. 2 represents a tank 2 having a form adjoining a truncated cone to a cylinder.

Moreover, the fuselage 1 comprises, in the direction of advance E of the aircraft AC, at least one fuselage section T1 configured to receive a cockpit 6 and a fuselage section T2 configured to receive a passenger cabin 7.

In addition, the fuselage 1 comprises a fuselage section T3 distinct from the fuselage section T1 and from the fuselage section T2. The fuselage section T1, the fuselage section T2 and the fuselage section T3 each comprise a longitudinal axis that coincides with the longitudinal axis A.

The fuselage section T3 comprises two housings 3 intended to each house a tank 2. The two housings 3 are configured so that the longitudinal axis B of the two tanks 2 is parallel to the longitudinal axis A of the aircraft AC fuselage 1 when the two tanks 2 are installed in their housing 3.

Figure 3:
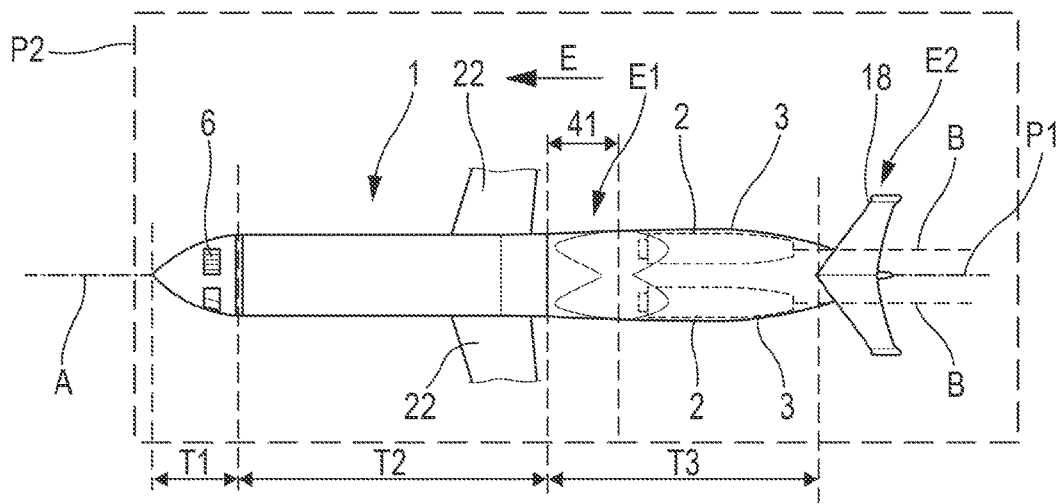
FIG. 3 represents a schematic upper view of an aircraft with liquid hydrogen tanks installed on board.

The two housings 3 are arranged symmetrically with respect to one another on either side of the vertical plane of symmetry P1. The two housings 3 are configured so that the second longitudinal axis B of the two tanks 2 lies in a common plane P2 when the two tanks are installed in their housing 3. The common plane P2 can be parallel to a horizontal plane (FIG. 3).

The two housings 3 make it possible to house two identical tanks 2, unlike the prior art in which the tandem arrangement of the tanks sometimes requires two tanks of different dimensions or sizes in order to be able to align them one behind the other. Indeed, the arrangement of the tanks 2 depends on the form of the fuselage 1 which, in the present configuration, allows an optimized surface of contact with the outside airstream (known as "wetted area").

Advantageously, the tanks 2 at least partly closely follow the form of the fuselage 1.

Figure 9:
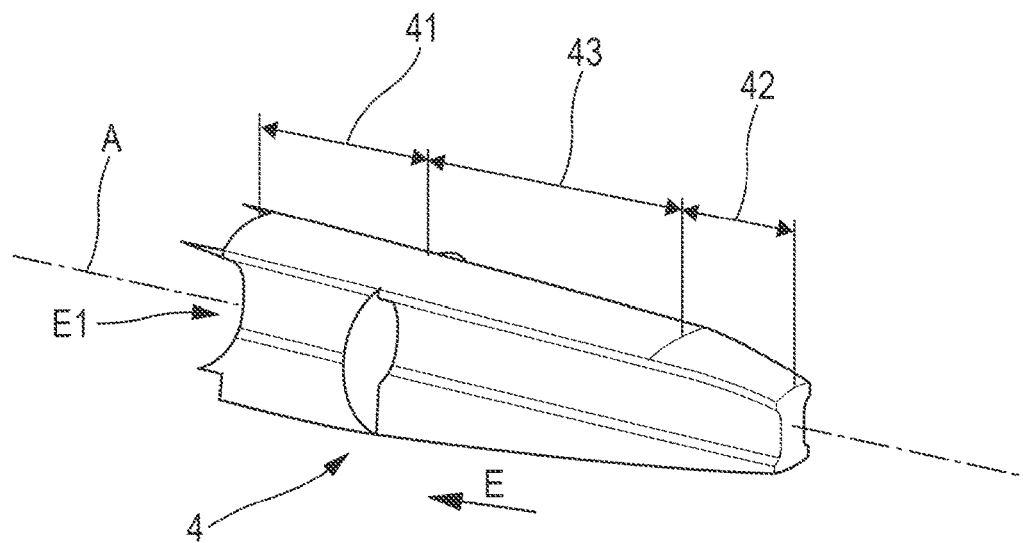
FIG. 9 represents a perspective rear view of a working structure to which the two tanks are intended to be fixed.

Advantageously, the fuselage section T3 comprises a working structure 4 to which the tank or tanks 2 are fixed. A structure is said to be a working structure when it is able to absorb forces applied to said structure. The working structure 4 can correspond to a monocoque structure comprising frames and stringers that are at least partly securely fixed to the fuselage section T3. The working structure 4 can have an elongate form along the longitudinal axis A (FIG. 9). It has a form comprising a plane of symmetry that coincides with the vertical plane of symmetry P1. The tanks 2 are intended to be fixed to the working structure 4 on either side of the plane of symmetry. Other features of the working structure 4 are described hereinbelow in the description.

Figure 7:
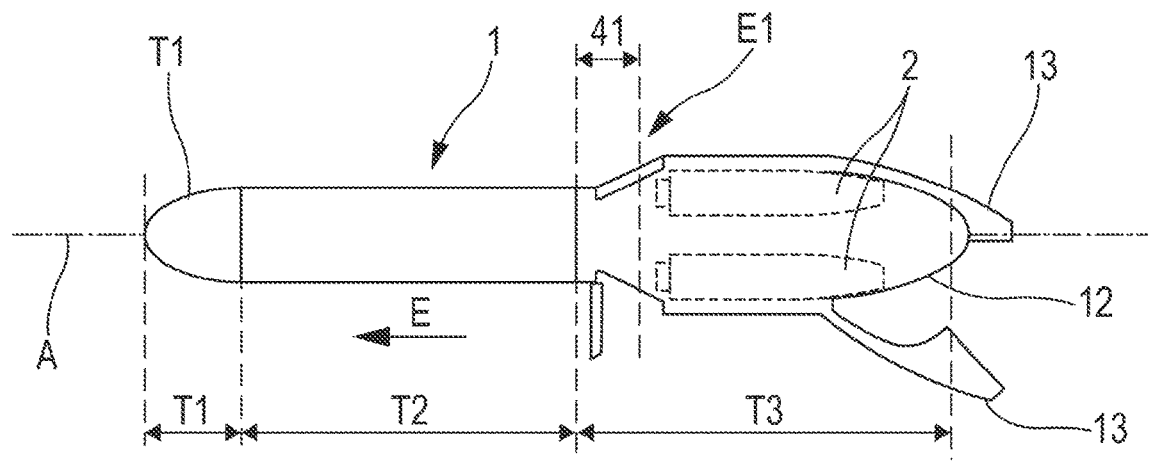
FIG. 7 represents a schematic upper view of a fuselage comprising rear openings.
Figure 8:
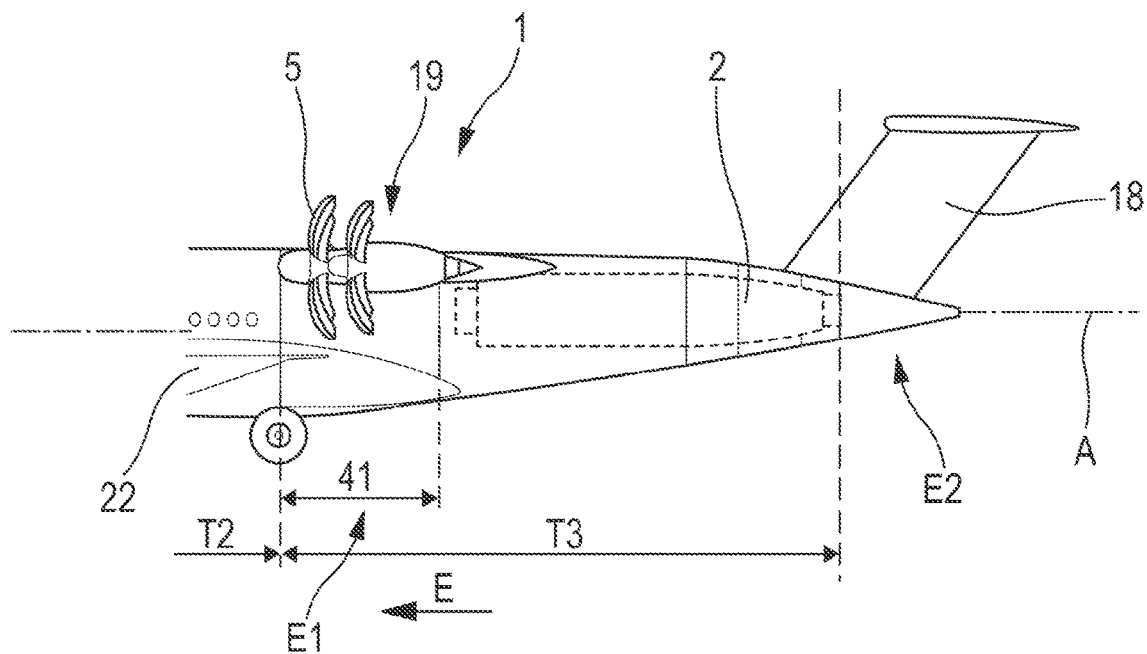
FIG. 8 represents a side view of the rear of an aircraft with tanks containing liquid hydrogen installed on board.

In a first embodiment illustrated in FIG. 3, FIG. 7 and FIG. 8, the fuselage section T3 is situated to the rear of the fuselage section T2. Furthermore, the fuselage section T3 comprises a sealed bulkhead 14 separating the fuselage section T2 and the fuselage section T3. The fuselage section T3 does not need to be pressurized like the fuselage section T2.

According to the type of aircraft AC and the position of the engines 5, the working structure 4 can have a length along the longitudinal axis A greater than the length needed to house the tanks 2.

Thus, the fuselage section T3 can comprise a front zone E1 situated between the fuselage section T2 and the two housings 2 (FIG. 3, FIG. 7, FIG. 8, FIG. 9). This front zone E1 can comprise a portion 41 of the working structure 4 intended to at least partially receive the propulsion system or systems 19 of the aircraft AC.

The propulsion system or systems 19 can comprise a device allowing the engines 5 of the propulsion system or systems 19 to be supplied (FIG. 8).

In addition, the fuselage section T3 can comprise a rear zone E2 (FIG. 9). This rear zone E2 comprises a portion 42 of the working structure 4 intended to receive a vertical tail unit 18 of the aircraft AC.

Figure 10:
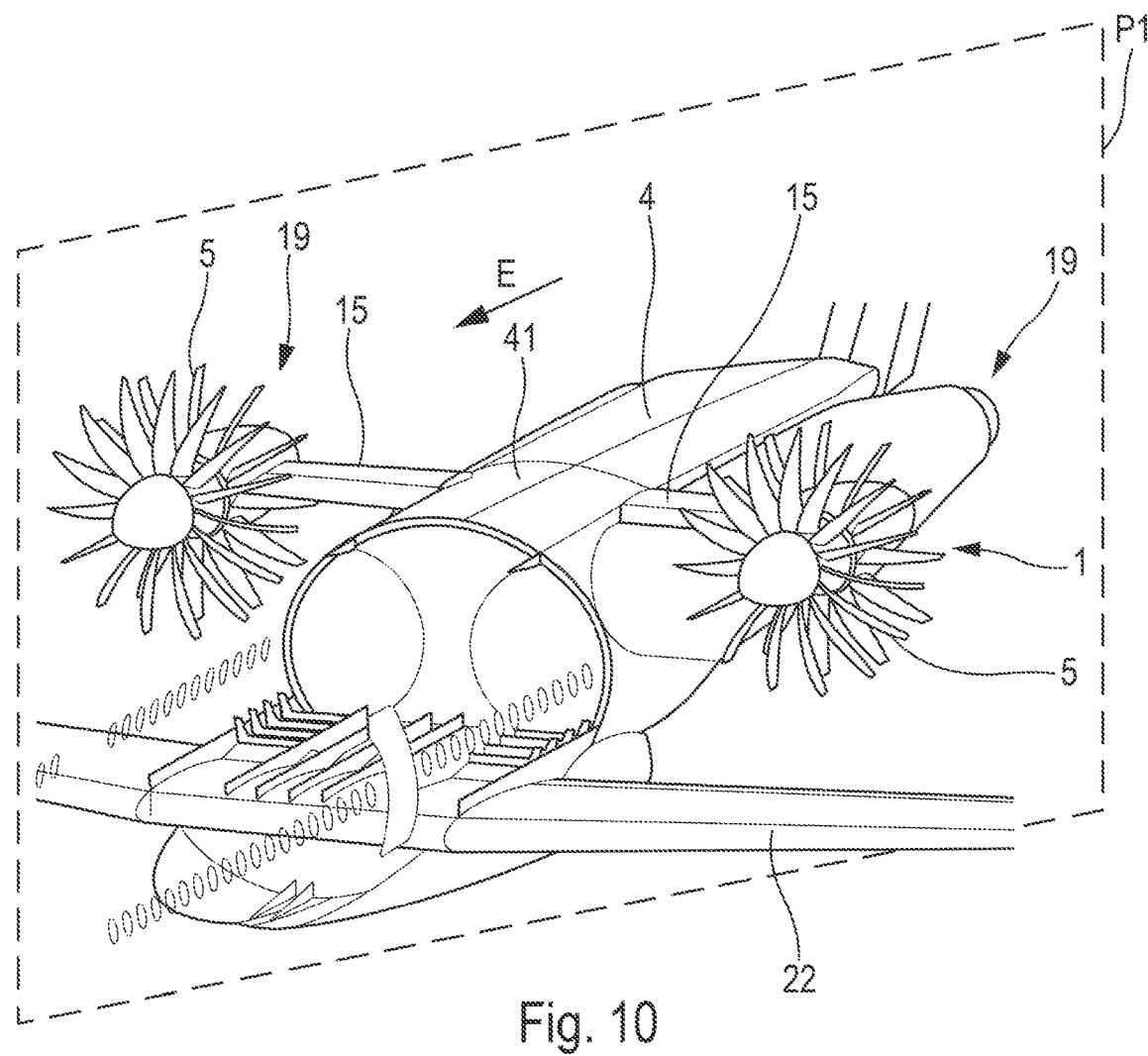
FIG. 10 represents a perspective front view of an aircraft that is open on the housings intended to receive the tanks and with engine pylons fixed to the working structure to which the two tanks are intended to be fixed.

Moreover, in the case where the aircraft comprises turboprop engines, the fuselage 1 can comprise two engine 5 pylons 15 fixed to the portion 41 of the working structure 4 on either side of the vertical plane of symmetry P1 (FIG. 10).

Figure 11:
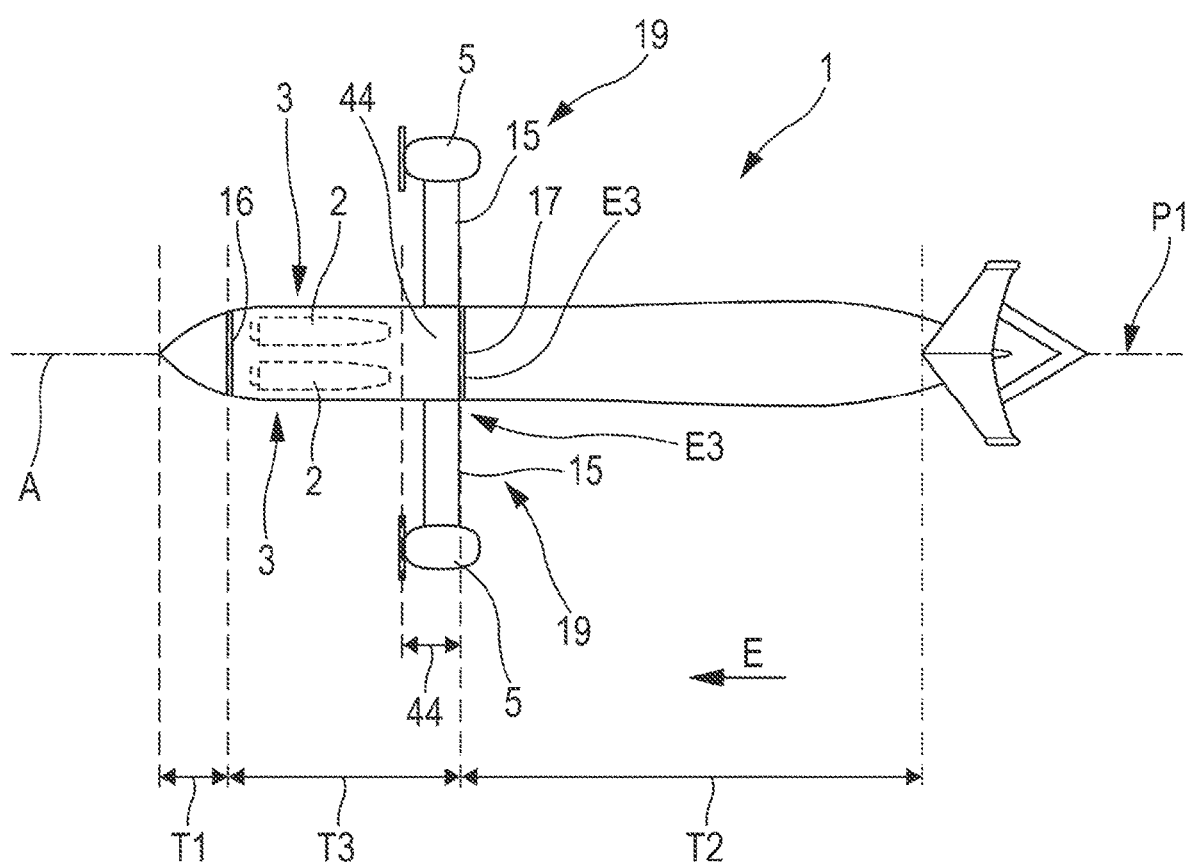
FIG. 11 represents an upper view of a fuselage according to the second embodiment.

In a second embodiment illustrated in FIG. 11, the fuselage section T3 is situated between the fuselage section T1 and the fuselage section T2. In addition, the fuselage section T3 comprises a sealed bulkhead 16 separating the fuselage section T1 and the fuselage section T3. The fuselage section T3 further comprises a sealed bulkhead 17 separating the fuselage section T3 and the fuselage section T2. The fuselage section T3 does not need to be pressurized like the fuselage section T2 or the fuselage section T1.

In addition, the fuselage section T3 can comprise a rear zone E3 situated between the two housings 3 and the fuselage section T2. This rear zone E3 comprises a portion 44 of the working structure 4 intended to bear the propulsion system or systems 19 of the aircraft AC.

As for the first embodiment, in the case where the aircraft comprises turboprop engines, the fuselage 1 can comprise two engine 5 pylons 15 fixed to the portion 44 of the working structure 4 on either side of the vertical plane of symmetry P1.

Figure 5:
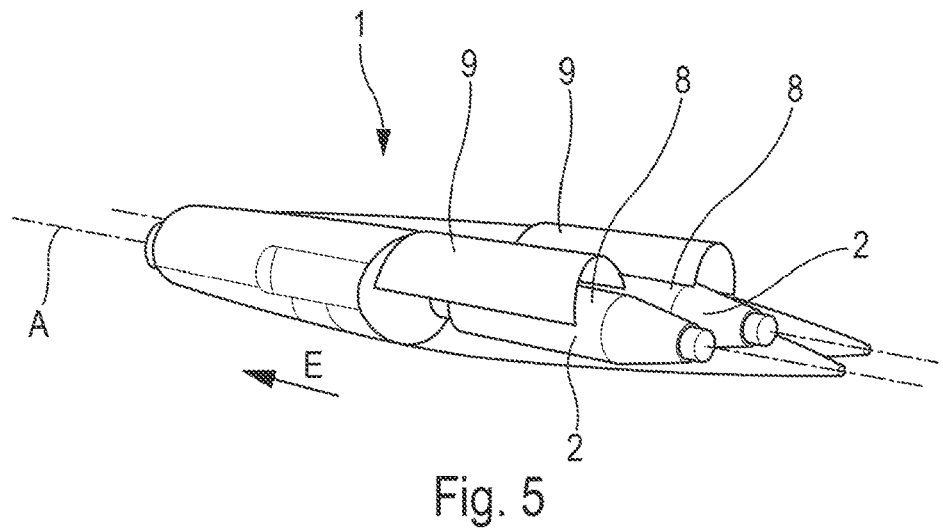
FIG. 5 represents a perspective rear view of a fuselage comprising lateral openings.

According to a first configuration represented in FIG. 5, the fuselage section T3 has two lateral openings 8 in a lateral part of the fuselage section T3. The two lateral openings 8 respectively connect with one of the two housings 3. Each of the two lateral openings 8 is configured to allow a tank 2 to be passed into a respective housing 3. According to a first variant, the fuselage section T3 comprises two removable fairings 9. Each of the two removable fairings 9 is configured to alternately close and open a respective lateral opening 8. FIG. 5 represents the two removable fairings 9 in an open position. According to a second variant (not represented), the fuselage section 3 comprises two doors. Each of the two doors is configured to alternately close and open a respective lateral opening 8. Each of the two doors is mounted to pivot about an axis parallel to the longitudinal axis A so as to be able to be open upward.

The two lateral openings 8 can have dimensions allowing the tanks 2 to pass parallel to a horizontal plane through the lateral parts of the aircraft AC. For that, in a nonlimiting manner, a first lateral opening of the two lateral openings 8 can have an angular opening dimension stretching from 30° to 150° with respect to the vertical plane of symmetry P1. The second lateral opening of the two lateral openings 8 can have an angular opening dimension stretching from −30° to −150° with respect to the vertical plane of symmetry P1.

Figure 6:
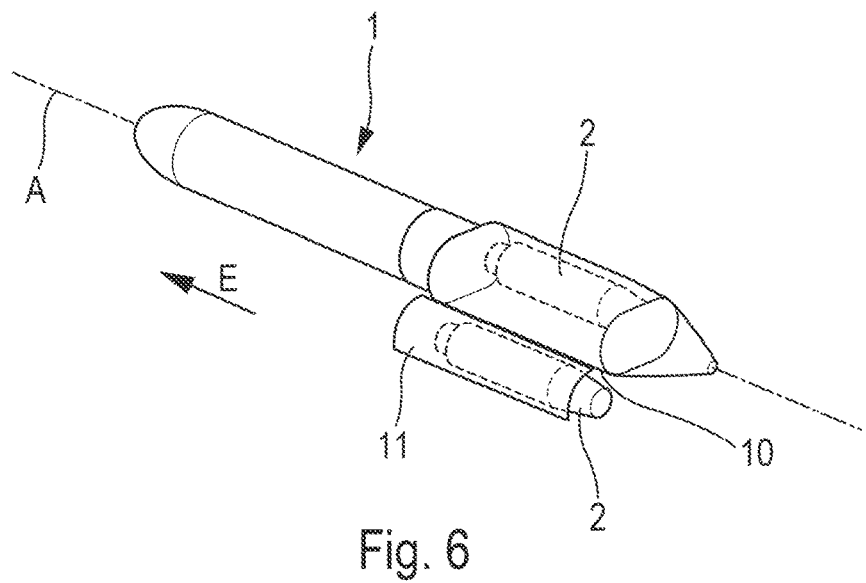
FIG. 6 represents a perspective rear view of a fuselage comprising lower openings.

According to a second configuration represented in FIG. 6, the fuselage section T3 has two lower openings 10 in a lower part of the fuselage section T3. The two lower openings 9 respectively connect with one of the two housings 3. Each of the two lower openings 9 is configured to allow a tank 2 to be passed into a respective housing 3. The fuselage section T3 comprises two lower working doors 11. Each of the two lower working doors 11 is configured to alternately close and open a respective lower opening 9. The two lower openings 9 allow the tanks 2 to pass parallel to the vertical plane of symmetry P1 through the belly of the aircraft AC. FIG. 6 represents one of the two lower working doors 11 in an open position allowing a tank 2 to pass through. The other of the two lower working doors 11 is represented in a closed position. For example, each of the two lower working doors 11 can be mounted to pivot about an axis parallel to the longitudinal axis A so as to be able to be opened downward.

According to a third configuration represented in FIG. 7, the fuselage section T3 has two rear openings 12 in a rear part of the fuselage section T3. The two rear openings 12 connect respectively with one of the two housings 3. Each of the two rear openings 12 is configured to allow a tank 2 to be passed into a respective housing 3. The fuselage section T3 comprises two rear working doors 13. Each of the two rear working doors 13 is configured to alternately close and open a respective rear opening 12. The two rear openings 12 allow the tanks 2 to pass through parallel to a horizontal plane. FIG. 7 represents one of the two rear working doors 13 in an open position while the other of the two rear working doors 13 is in a closed position. For example, each of the two rear working doors 13 can be mounted to pivot about an axis at right angles to the longitudinal axis A so that it can be opened laterally.

Access to the housings of the tanks arranged in tandem according to the prior art entails the use of access doors to the tanks through the cladding of the fuselage 1 that are of significant dimensions or a removable rear part of the fuselage, which can cause disadvantages as to the weight of the aircraft AC or strains on the cladding panels of the fuselage 1.

Figure 4:
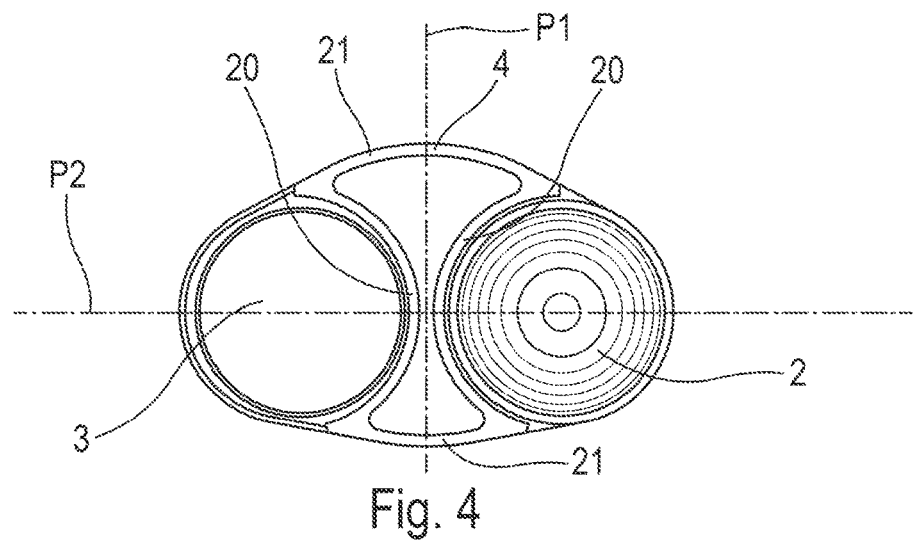
FIG. 4 represents a cross section of a working structure to which the two tanks are intended to be fixed.

For all three configurations, the working structure 4 can partition the two housings 3. In other words, the working structure 4 forms a separation between the two housings 3. The two tanks 2 are therefore well isolated from one another when they are housed in the two housings 3. As represented in FIG. 4, the working structure 4 can correspond to a closed, or "boxed", structure. It can have a cross section that is symmetrical with respect to the vertical plane of symmetry P1. In FIG. 4, the working structure 4 comprises two curved walls 20 that are symmetrical with respect to the vertical plane of symmetry P1. These curved walls 20 each at least partly form the wall of a respective housing 3. Each of the curved walls 20 is configured to closely follow the form of the tank 2 intended to be installed in the housing 3. The working structure 4 also comprises two curved walls 21. These two curved walls 21 link the two curved walls 20: one curved wall 21 links the curved walls 20 in their upper parts and the other curved wall 21 links the curved walls 20 in their lower parts. These two curved walls 21 form a part of the fuselage 1 in contact with the outside air stream.

Figure 12:
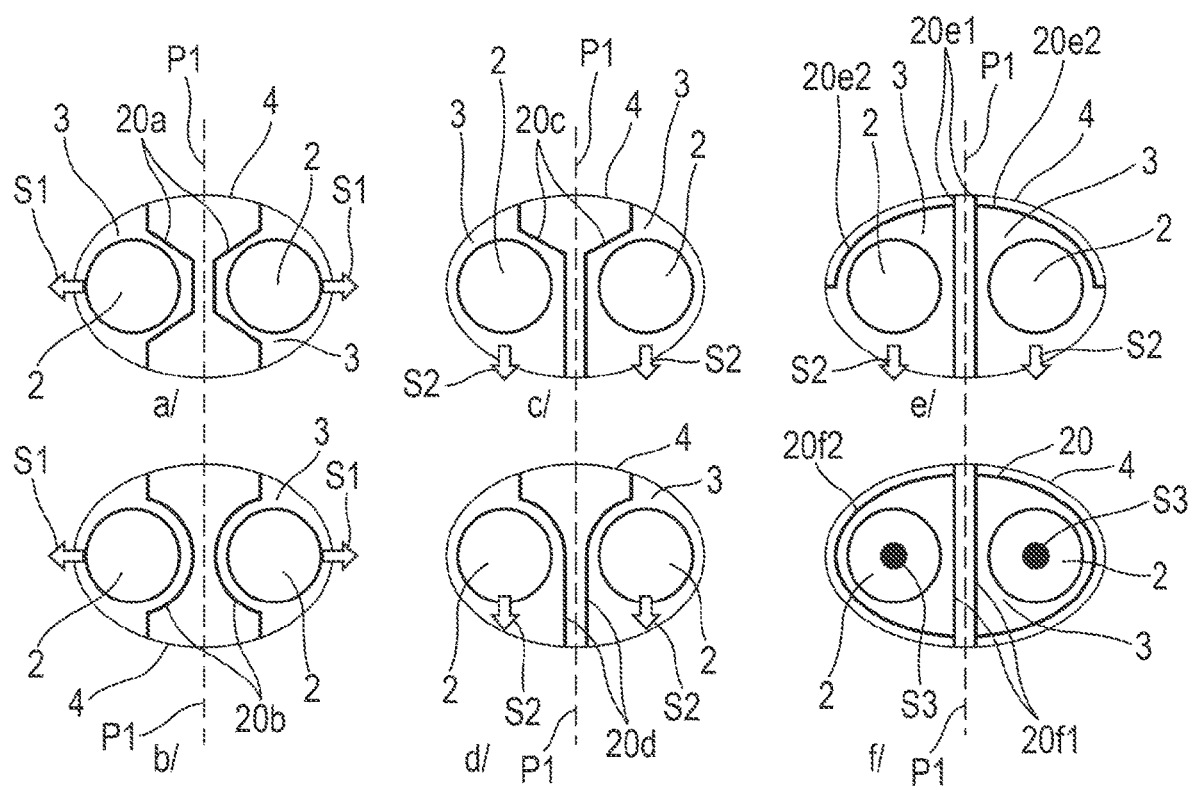
FIG. 12 illustrates several examples of working structures represented in cross section.

FIG. 12 represents other examples a, b, c, d, e, f of cross sections of the working structure 4.

The examples a and b of FIG. 12 represent working structures 4 intended to be used for lateral openings 8 allowing the tank 2 to pass parallel to a horizontal plane through the lateral parts of the aircraft AC. The arrows S1 represent the direction of lateral displacement of the tanks 2 when they are removed from the housings 3. In the example a, the two curved walls 20 are replaced by straight walls 20a. In the example b, the two curved walls 20 are replaced by walls 20b, including two straight walls and one curved wall between the two straight walls.

The examples c, d and e of FIG. 12 represent working structures 4 intended to be used for lower openings 9 allowing the tanks 2 to pass parallel to the vertical plane of symmetry P1 through the belly of the aircraft AC. The arrows S2 represent the direction of downward displacement of the tanks 2 when they are removed from the housings 3. In the example c, the two curved walls 20 are replaced by walls 20c comprising two straight walls. In the example d, the two curved walls 20 are replaced by walls 20d comprising one straight wall and one partially curved wall. In the example e, the two curved walls 20 are replaced by straight walls 20e1 intended to isolate the tanks 2 from one another and by walls 20c2 intended to cover an upper part of the tanks 2.

The example f of FIG. 12 represents a working structure 4 intended to be used for rear openings 12 allowing the tanks 2 to pass through parallel to a horizontal plane. The arrows S3 represent the direction of rearward displacement of the tanks 2 when they are removed from the housings 3. In the example f, the two curved walls 20 are replaced by straight walls 20f1 intended to isolate the tanks 2 from one another and by walls 20f2 intended to surround the tanks 2.

In an example that is not represented, the engines 5 can be fixed to an airfoil 22 fixed to the fuselage 1, at least partly to the section T2 and/or to the section T3. The engines 5 can be fixed on the airfoil 22 or under the airfoil 22.

The working structure 4 makes it possible to link the two tanks 2 to the fuselage 1. It also makes it possible to ensure a transfer of load from the vertical tail unit 18 to the front of the fuselage 1. It makes it possible to further secure the use of tanks 2 containing liquid hydrogen by ensuring a partitioning between the two tanks 2. It can also provide a chamber for housing different technical systems, such as the flight control circuit of the aircraft AC or electrical lines of an auxiliary power unit on board when this auxiliary unit is situated at the rear of the aircraft AC.

For the third configuration (FIG. 7), the working structure 4 can surround the two housings 3 in addition to partitioning the two housings 3. Thus, the working structure 4 longitudinally delimits each of the two housings 3. When the two tanks 2 are received in the two housings 3, the two tanks are therefore well isolated from one another while being surrounded circumferentially by the working structure 4. The working structure 4 can correspond to a self-stiffened sail.

The invention claimed is:

1. An aircraft fuselage configured to receive two tanks configured to contain liquid hydrogen for supplying engines of at least one propulsion system of the aircraft (AC), the fuselage having a vertical plane of symmetry (P1) and a first longitudinal axis (A), the two tanks each having a second longitudinal axis (B), the fuselage comprising, in a direction of advance (E) of the aircraft (AC), at least one first fuselage section (T1) configured to receive a cockpit and one second fuselage section (T2) configured to receive a passenger cabin, and
   a third fuselage section (T3) distinct from the first fuselage section (T1) and from the second fuselage section (T2), the third fuselage section (T3) comprising two housings configured to each house a tank, the two housings are configured so that the second longitudinal axis (B) of the two tanks is parallel to the first longitudinal axis (A) of the fuselage of the aircraft (AC) when the two tanks are installed in their housing, the two housings arranged symmetrically with respect to one another on either side of the vertical plane of symmetry (P1), the two housings configured so that the second longitudinal axis (B) of the two tanks lies in a common plane (P2) when the two tanks are installed in their housing,
   wherein the first fuselage section (T1), the second fuselage section (T2), and the third fuselage section (T3) extend sequentially to one another along the first longitudinal axis (A).

2. The fuselage as claimed in claim 1, wherein the third fuselage section (T3) comprises a working structure to which the two tanks are fixed.

3. The fuselage as claimed in claim 1, wherein the third fuselage section (T3) is situated to the rear of the second fuselage section (T2), the third fuselage section (T3) comprising a sealed bulkhead separating the second fuselage section (T2) and the third fuselage section (T3).

4. The fuselage as claimed in claim 2, wherein the third fuselage section (T3) is situated to the rear of the second fuselage section (T2), the third fuselage section (T3) comprising a sealed bulkhead separating the second fuselage section (T2) and the third fuselage section (T3), and
   wherein the third fuselage section (T3) comprises a front zone (E1) situated between the second fuselage section (T2) and the two housings, the front zone (E1) comprising a first portion of the working structure configured to receive the propulsion system or systems of the aircraft (AC).

5. The fuselage as claimed in claim 4, further comprising: two engine pylons fixed to the first portion of the working structure on either side of the vertical plane of symmetry (P1).

6. The fuselage as claimed in claim 4, wherein the third fuselage section (T3) is situated to the rear of the second fuselage section (T2), the third fuselage section (T3) comprising a sealed bulkhead separating the second fuselage section (T2) and the third fuselage section (T3), and
   wherein the third fuselage section (T3) comprises a rear zone (E2), the rear zone (E2) comprising a second portion of the working structure configured to receive a vertical tail unit of the aircraft (AC).

7. The fuselage as claimed in claim 1, wherein the third fuselage section (T3) is situated between the first fuselage section (T1) and the second fuselage section (T2), the third fuselage section (T3) comprising a first sealed bulkhead separating the first fuselage section (T1) and the third fuselage section (T3), the third fuselage section (T3) further comprising a second sealed bulkhead separating the third fuselage section (T3) and the second fuselage section (T2).

8. The fuselage as claimed in claim 5,
wherein the third fuselage section (T3) comprises a rear zone (E3) situated between the two housings and the second fuselage section (T2), the rear zone (E3) comprising a portion of the working structure configured to bear the propulsion system or systems of the aircraft (AC).

9. The fuselage as claimed in claim 4, further comprising:
two engine pylons fixed to the portion of the working structure on either side of the vertical plane of symmetry (P1).

10. The fuselage as claimed in claim 1,
wherein the third fuselage section (T3) has two lateral openings in a lateral part of the third fuselage section (T3), the two lateral openings respectively connecting with one of the two housings, each of the two lateral openings configured to allow a tank to be passed into a respective housing, the third fuselage section (T3) comprising two removable fairings, each of the removable fairings configured to alternately close and open a respective lateral opening.

11. The fuselage as claimed in claim 1,
wherein the third fuselage section (T3) has two lower openings in a lower part of the third fuselage section (T3), the two lower openings respectively communicating with one of the two housings, each of the two lower openings configured to allow a tank to be passed into a respective housing, the third fuselage section (T3) comprising two lower working doors, each of the lower working doors configured to alternately close and open a respective lower opening.

12. The fuselage as claimed in claim 1,
wherein the third fuselage section (T3) has two rear openings in a rear part of the third fuselage section (T3), the two rear openings respectively connecting with one of the two housings, each of the two rear openings configured to allow a tank to be passed into a respective housing, the third fuselage section (T3) comprising two rear working doors, each of the two rear working doors configured to alternately close and open a respective rear opening.

13. The fuselage as claimed in claim 2,
wherein the third fuselage section (T3) is situated to the rear of the second fuselage section (T2), the third fuselage section (T3) comprising a sealed bulkhead separating the second fuselage section (T2) and the third fuselage section (T3), and
wherein the working structure partitions the two housings.

14. The fuselage as claimed in claim 2,
wherein the third fuselage section (T3) is situated to the rear of the second fuselage section (T2), the third fuselage section (T3) comprising a sealed bulkhead separating the second fuselage section (T2) and the third fuselage section (T3), and
wherein the working structure surrounds the two housings.

15. The fuselage as claimed in claim 2,
wherein the third fuselage section (T3) is situated to the rear of the second fuselage section (T2), the third fuselage section (T3) comprising a sealed bulkhead separating the second fuselage section (T2) and the third fuselage section (T3), and
wherein the working structure has a form that is elongate along the longitudinal axis (A) and with a plane of symmetry that coincides with the vertical plane of symmetry (P1).

16. An aircraft,
comprising a fuselage as claimed in claim 1.

* * * * *